July 3, 1962 R. E. BARNES 3,042,877
HUM COMPENSATOR
Filed Dec. 19, 1958
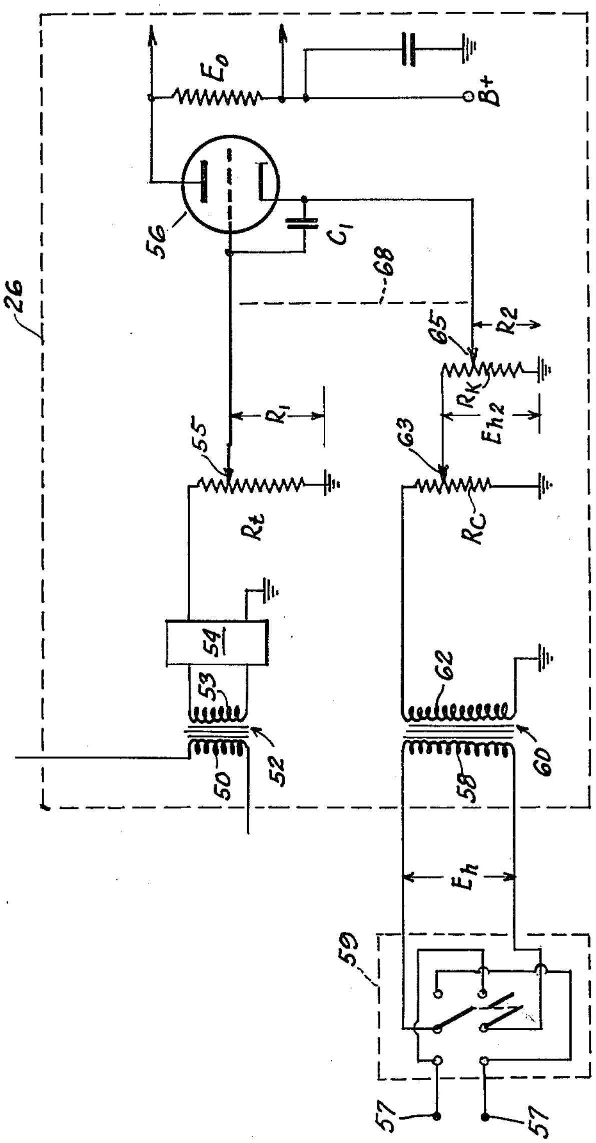
INVENTOR.
Robert E. Barnes
BY Zabel, Baker, York, Jones & Dithmar
Attorneys 3,042,877
HUM COMPENSATOR
Robert E. Barnes, 114 E. Grove St., Algona, Iowa
Filed Dec. 19, 1958, Ser. No. 781,726
5 Claims. (Cl. 330—149)

This invention relates to a hum compensator and more particularly to a compensator for cancelling out unwanted signals in a signal analyzer.

Signal analyzers are instruments which are connected to signal producing devices for investigating the operation of these devices by an analysis of their signals. Objectionable signals or hum can occur in these signal analyzers whenever the power supply for the signal analyzer is connected to the same power source which drives the device whose signal is being investigated.

What is needed, therefore, and comprises the principal object of this invention is a circuit for eliminating an undesired signal from an analyzer where terminals exist across which the undesired signal occurs separately.

The single FIGURE of the drawing is a circuit embodying a preferred form of the invention.

Referring to the drawing, the circuit generally designated 26 is part of a signal analyzer, for example the vertical signal circuit of an oscilloscope. The circuit includes a main input transformer 52 having primary 50 and secondary 53. In some instances the circuit will include a rectifier 54 connected to secondary 53.

The output of secondary 53 (or rectifier 54) is connected to the gain control of the vertical amplifier tube 56 as a bias. It is also to be understood that other methods of biasing the amplifier tube may be used, depending on the exact nature of the circuit. In this instance, however, the gain control consists of a potentiometer with the voltage from rectifier 54 connected across resistance $R_t$. Adjustable contact 55 of this gain control potentiometer is connected to the grid of the vertical amplifier tube 56, so that the grid voltage equals the voltage drop across resistance $R_1$. In this way, the bias of tube 56 may be varied by moving contact 55 and changing the value of resistance $R_1$.

The signal voltage applied to primary 50 of main input transformer 52 is a composite of desired and undesired signal voltages. As can be seen by the circuit, the undesired signal is connected to the grid of the tube where it would be amplified in proportion with the desired signal, and unless precautions are taken it would appear as an undesired component in the output voltage $E_o$ of the vertical amplifier tube 56.

Mathematically this effect can be described as follows: If the signal to the grid of tube 56 is made up of two signal voltages, one related to the desired signal and denoted as $E_s$ and the other related to the hum or noise signal and denoted as $E_h$, and if A represents the amplification of grid applied signals by tube 56, the output voltage of the tube $E_o=AR_1/R_t(E_s+E_h)$; and the component $AR_1/R_t.E_h$ is the undesired voltage signal which must be cancelled.

As here shown, the undesired signal voltage $E_h$ appears across terminals 57—57. The following described cancellation circuit is effective to eliminate this voltage from the output of tube 56.

Terminals 57—57 are connected to a polarity reversing switch 59 which in turn is connected to primary 58 of a cancellation circuit transformer 60.

The transformer 60 is selected and switch 59 is adjusted so the voltage across secondary coil 62 will be larger than $E_h$ and in phase with it. From the point of view of durability and reliability transformer 60 has proven very effective as voltage amplifying device, but it is to be understood that other voltage amplifying devices, such as the conventional electron tube voltage amplifiers may be used and are contemplated, and the claims should be construed accordingly.

One end of this secondary coil 62 is grounded and the other end is connected to one end of a grounded calibrating potentiometer $R_c$. Adjustable slide contact 63 of potentiometer $R_c$ is connected to one end of a grounded potentiometer $R_k$. Adjustable contact 65 of $R_k$ is connected to the cathode of the amplifying tube 56 and its position controls the magnitude of the voltage $E_{h2}$ applied to the cathode of vertical amplifying tube 56.

$R_c$ is calibrated as follows: $R_1$ is set equal to $R_t$ and $R_2$ is set equal to $R_k$. Then if A′ is the amplification of cathode applied signals by tube 56, A (amplification of grid applied signals) will substantially equal A′ in this particular circuit and $R_c$ can be adjusted so $E_h$ equals $E_{h2}$ where $E_{h2}$ is under these special circumstances the voltage across $R_k$. Since voltage $E_h$ applied to the grid of the tube 56 is in phase with $E_{h2}$, both of these signals will cancel each other in the tube output. It is important to note that this condition occurs only when $R_1$ equals $R_t$ and $R_2$ equals $R_k$. This condition is not normally true because the gain of the tube and consequently the value of $R_1$ is frequently changed. However if the tapers of $R_t$ and $R_k$ are properly chosen and the contacts 55 and 65 are ganged together as indicated by dotted line 68 between them in the drawing, then the voltage output $E_o$ of the tube 56 can be free from undesired hum, hash, or noise regardless of the gain setting on the tube. In general, $$E_o=[AR_1/R_t.E_s]+[AR_1/R_t.E_h]-[A'R_2/R_k.E_{h2}]$$

For complete cancellation of the undesired signal regardless of the gain, this condition must be true: $AR_1/R_t.E_h$ must equal $A'R_2/R_k.E_{h2}$. This condition will be true in a circuit with the parameters described above if the tapers of the potentiometers are selected so that when they are ganged together $R_1/R_t$ will always equal $R_2/R_k$.

Although the principles of this invention have been shown as applied to an oscilloscope, it is to be understood that the above described principles for the cancellation of undesired signals could be applied to any kind of an analytical detector in place of the oscilloscope, so long as the signal to the detector comprises both a desired signal and an undesired signal and so long as the undesired signal can be found to exist separately.

The invention may be embodied in other forms without departing from the spirit or essential characteristics thereof as set forth in the claims and the present embodiment is therefore to be considered as illustrative and not restrictive and it is intended to include all changes which come within the scope and range of the claims.

I claim:

1. In a signal analyzer which is adapted to be connected to a signal producing mechanism where a desired and undesired signal voltage arising from any source in the signal producing mechanism are superimposed on each other and are connected to the gain control of an amplifying tube in the signal analyzer and where the undesired signal voltage exists separately across terminals, said gain control comprising a first potentiometer resistance grounded at one end, the total signal voltage to said amplifier tube connected across said first potentiometer resistance, the slide contact of said first potentiometer resistance connected to the grid of said amplifying tube whereby the gain of said tube may be varied, the undesired signal voltage across said terminals connected across a second potentiometer resistance grounded at one end in phase with the undesired signal voltage on said first potentiometer, the slide contact of said second potentiometer resistance connected to the cathode of said tube whereby the magnitude of the undesired signal voltage applied to said cathode may be varied, the slide contacts of said first and second potentiometers ganged together for simultaneous operation, the taper of the potentiometers selected so that the product of the amplification of the grid applied signal voltage and the magnitude of the undesired component of the signal voltage being applied to the grid is equal to the product of the amplification of the cathode applied signal voltage and the magnitude of the undesired signal voltage on the cathode of said tube so that the undesired signal voltage component is automatically cancelled in the tube regardless of the gain of the tube and only the desired signal voltage is amplified by the tube, and polarity reversing means connected between said terminals and said second potentiometer to make certain the undesired signal voltage on the cathode is in phase with the undesired signal voltage on the grid.

2. In a signal analyzer which is adapted to be connected to a signal producing mechanism where a desired signal voltage and an undesired signal voltage arising from any source in the signal producing mechanism are superimposed on each other and are connected to the gain control potentiometer of an amplifying tube in the signal analyzer and where the undesired signal voltage appears separately across terminals, a transformer, the primary of said transformer connected to said terminals, the secondary of said transformer selected so its output voltage is at least equal to the magnitude of the undesired signal voltage on the gain control potentiometer, one end of said secondary grounded and the other end connected to one end of a calibrating potentiometer grounded at one end, said calibrating potentiometer adjusted so the voltage between the slide contact on said calibrating potentiometer and ground is equal and in phase with the undesired signal voltage applied across the gain control potentiometer of the amplifying tube, the slide contact of said calibrating potentiometer connected to a second potentiometer grounded at one end, the slide contact of said second potentiometer connected to the cathode of said amplifying tube whereby the magnitude of the voltage applied to said cathode may be varied, the slide contacts of said gain control potentiometer and said second potentiometer ganged together for simultaneous operation, the taper of the gain control potentiometer and the second potentiometer selected so the product of the amplification of the grid applied signal voltage and the magnitude of the undesired component of the signal voltage applied to the grid of the amplifying tube is equal to the product of the amplification of the cathode applied signal voltage and the magnitude of the undesired signal voltage on the cathode of said tube, regardless of the gain of the tube, so that the undesired signal voltage component will be cancelled in said tube and only the desired signal voltage will be amplified, and polarity reversing means connected between said terminals and said second potentiometer to make certain the undesired signal voltage on the cathode is in phase with the undesired signal voltage on the grid.

3. In a signal analyzer which is adapted to be connected to a signal producing mechanism where a desired signal voltage and an undesired signal voltage arising from any source in the signal producing mechanism are superimposed on each other and are connected to the gain control and thence to the grid of an amplifying tube in the signal analyzer, and where the undesired signal voltage exists separately across terminals, means connecting said undesired signal voltage across said terminals to the cathode of said amplifying tube, and means automatically regulating the magnitude of said undesired signal voltage connected to said cathode in accordance with the gain control setting of the tube and the magnitude of the undesired signal voltage on said grid so that the undesired signal voltage on the grid will be equal in magnitude and in phase with the cathode applied signal voltage regardless of the gain of the tube whereby only the desired signal voltage will be amplified by said tube.

4. The apparatus set forth in claim 3 wherein the gain control of said amplifying tube comprises a first potentiometer resistance grounded at one end, the total signal voltage to said amplifier tube connected across said potentiometer resistance, the slide contact of said first potentiometer resistance connected to said grid whereby the gain of said tube may be varied, said means automatically regulating the magnitude of the undesired signal voltage connected to said cathode comprising a second potentiometer, the undesired signal voltage across said terminals connected across said second potentiometer, the slide contact of said second potentiometer resistance connected to said cathode whereby the magnitude of the voltage applied to said cathode may be varied, the slide contacts of said first and second potentiometers ganged together for simultaneous operation, the taper of the potentiometers selected so that the product of the amplification of the grid applied signal voltage and the magnitude of the undesired component of the signal voltage applied to the grid is equal to the product of the amplification of the cathode applied signal voltage on said tube and the magnitude of the undesired signal voltage applied to the cathode of said tube.

5. In an electronic circuit having a gain control where a desired signal voltage and an undesired signal voltage arising from any source are superimposed on the gain control of the circuit and where the undesired signal voltage exists separately across terminals, means connecting said undesired signal voltage on said terminals to an element in said circuit to oppose the undesired signal voltage in the circuit, and means automatically regulating the magnitude of the undesired signal voltage applied to said element in accordance with the setting of the gain control of the circuit, said gain control comprising a first potentiometer, the desired and undesired signal voltage connected across said first potentiometer, the slide contact of said first potentiometer connected to said circuit whereby the gain of said circuit is varied when the slide contact is moved, said means automatically regulating the magnitude of the undesired signal voltage applied to said element comprising a second potentiometer with the slide contact of said second potentiometer connected to said element, the slide contacts of said first and second potentiometers ganged together for simultaneous operation, the taper of the potentiometers selected so that the undesired signal voltage across said first potentiometer will be cancelled by the undesired signal voltage applied to said element regardless of the setting of the slide contact of said first potentiometer.

References Cited in the file of this patent

UNITED STATES PATENTS

| | | |
|---|---|---|
| 2,161,418 | Jones | June 6, 1939 |
| 2,438,217 | Johnson | Mar. 23, 1948 |
| 2,622,150 | Coulter | Dec. 16, 1952 |
| 2,756,328 | Braak | July 24, 1956 |
| 2,970,276 | Dollinger | Jan. 31, 1961 |